United States Patent
Ishigooka

(10) Patent No.: US 12,548,430 B2
(45) Date of Patent: Feb. 10, 2026

(54) GENERAL CONTROL SYSTEM

(71) Applicant: Hitachi, Ltd., Tokyo (JP)

(72) Inventor: Tasuku Ishigooka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 228 days.

(21) Appl. No.: 18/285,981

(22) PCT Filed: Mar. 1, 2022

(86) PCT No.: PCT/JP2022/008629
§ 371 (c)(1),
(2) Date: Oct. 6, 2023

(87) PCT Pub. No.: WO2022/244377
PCT Pub. Date: Nov. 24, 2022

(65) Prior Publication Data
US 2024/0119827 A1    Apr. 11, 2024

(30) Foreign Application Priority Data
May 18, 2021   (JP) ................................. 2021-084036

(51) Int. Cl.
*G08B 25/01* (2006.01)
*G08G 1/01* (2006.01)
*H04W 4/40* (2018.01)

(52) U.S. Cl.
CPC ......... *G08B 25/016* (2013.01); *G08G 1/0112* (2013.01); *H04W 4/40* (2018.02)

(58) Field of Classification Search
CPC .... G08B 25/016; G08G 1/0112; G08G 1/097; G08G 1/01; G08G 1/0104; G08G 1/0116;
(Continued)

(56) References Cited

U.S. PATENT DOCUMENTS

2020/0065978 A1\* 2/2020 Jales Costa .......... G06V 10/435
2020/0326701 A1\* 10/2020 Takechi ................ H04W 4/021
(Continued)

FOREIGN PATENT DOCUMENTS

JP      2019-215785 A    12/2019
WO    2020/039798 A1    2/2020
(Continued)

OTHER PUBLICATIONS

International Search Report, PCT/JP2022/008629, dated May 17, 2022 (4 pgs.).
(Continued)

*Primary Examiner* — Ryan W Sherwin
(74) *Attorney, Agent, or Firm* — Volpe Koenig

(57) ABSTRACT

A control system comprises: moving body detecting units transmitting information about moving bodies; and a control system receives the moving body information and transmits it to a control processing unit. The control system comprises: a surplus time calculation unit that calculates a first surplus time on the basis of the response time and an estimated time required for communication control of the moving body; a processing management unit that determines an execution sequence for the control information; an application unit that calculates control information on the basis of the information about moving bodies and the execution sequence determined by the processing management unit; and a transmission control unit that calculates a second surplus time on the basis of the response time of the moving body and the actual time required for communication control, and transmits control information to the control processing unit according to the second surplus time.

12 Claims, 17 Drawing Sheets

(58) Field of Classification Search
CPC .......... G08G 1/09; G08G 1/093; G08G 1/094; H04W 4/40
See application file for complete search history.

(56) References Cited

U.S. PATENT DOCUMENTS

| | | | |
|---|---|---|---|
| 2021/0049902 A1 | 2/2021 | Zhang et al. | |
| 2021/0150892 A1* | 5/2021 | Xu | G08G 1/005 |
| 2021/0319690 A1 | 10/2021 | Ogawa et al. | |
| 2021/0390848 A1* | 12/2021 | Ogawa | G08G 1/0112 |
| 2022/0139128 A1* | 5/2022 | Motegi | G06V 20/56 |
| | | | 701/1 |
| 2023/0115290 A1* | 4/2023 | Ogawa | H04L 67/1095 |
| | | | 701/24 |
| 2024/0242600 A1* | 7/2024 | Sarwar | G08G 1/0145 |
| 2024/0371264 A1* | 11/2024 | Budan | G06N 3/04 |

FOREIGN PATENT DOCUMENTS

| | | | | |
|---|---|---|---|---|
| WO | 2020/110857 A1 | 6/2020 | | |
| WO | WO-2020108839 A1 * | 6/2020 | ............ | H04W 4/024 |

OTHER PUBLICATIONS

International Preliminary Report on Patentability issued on Nov. 30, 2023 for PCT Patent Application No. PCT/JP2022/008629.

* cited by examiner

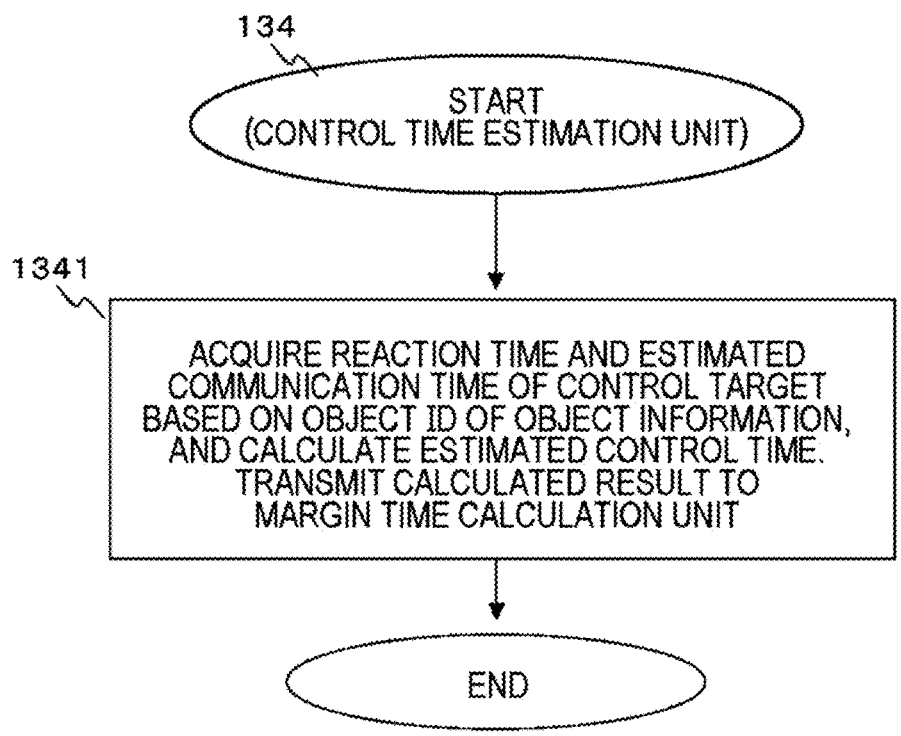
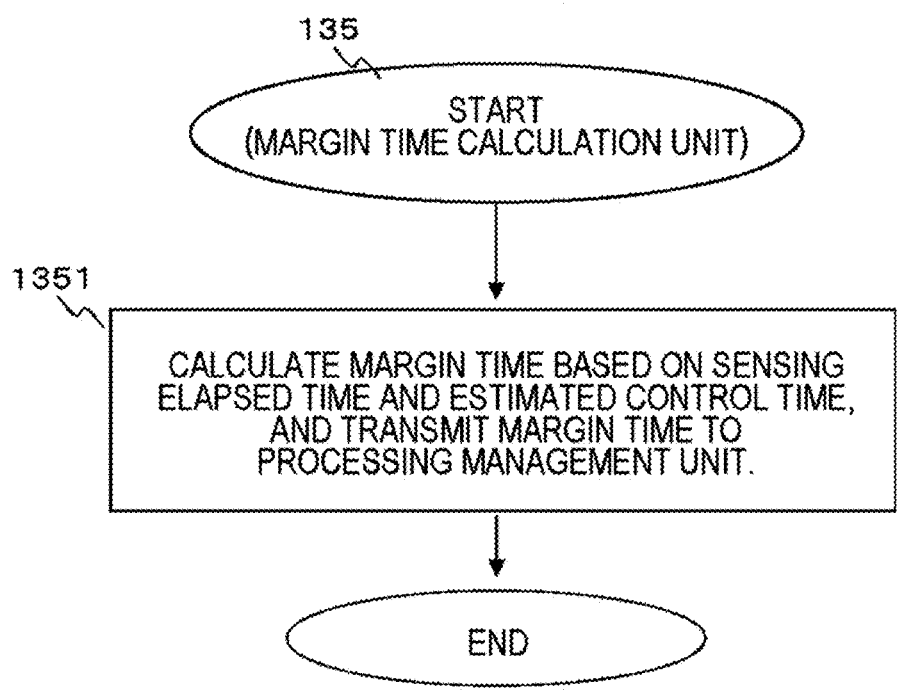

EQUATION (1) OF MARGIN TIME $T1_{Laxity}$ $$T1_{Laxity} = T_{E2EL} - (T_{IS} + T_{UL} + E_{SA} + E_{DL} + E_{VA})$$

EQUATION (2) OF MARGIN TIME $T2_{Laxity}$ $$T2_{Laxity} = T_{E2EL} - (T_{IS} + T_{UL} + T_{SA} + E_{DL} + E_{VA})$$

13A

| ITEM | SENSING INFORMATION |
|---|---|
| OBJECT TYPE | VEHICLE A |
| OBJECT ID | 1 |
| TIME STAMP | 12:34:0000 |

13B

| OBJECT ID | ITEM | REACTION TIME | IP ADDRESS | ESTIMATED COMMUNICATION TIME |
|---|---|---|---|---|
| 1 | VEHICLE A | 100ms | AAA | 1000ms |
| 2 | VEHICLE B | 200ms | BBB | 20ms |
| 3 | PEDESTRIAN A | 1000ms | CCC | 30ms |
| 4 | PEDESTRIAN B | 1000ms | DDD | 25ms |
| 5 | SIGNAL | 500ms | EEE | 20ms |

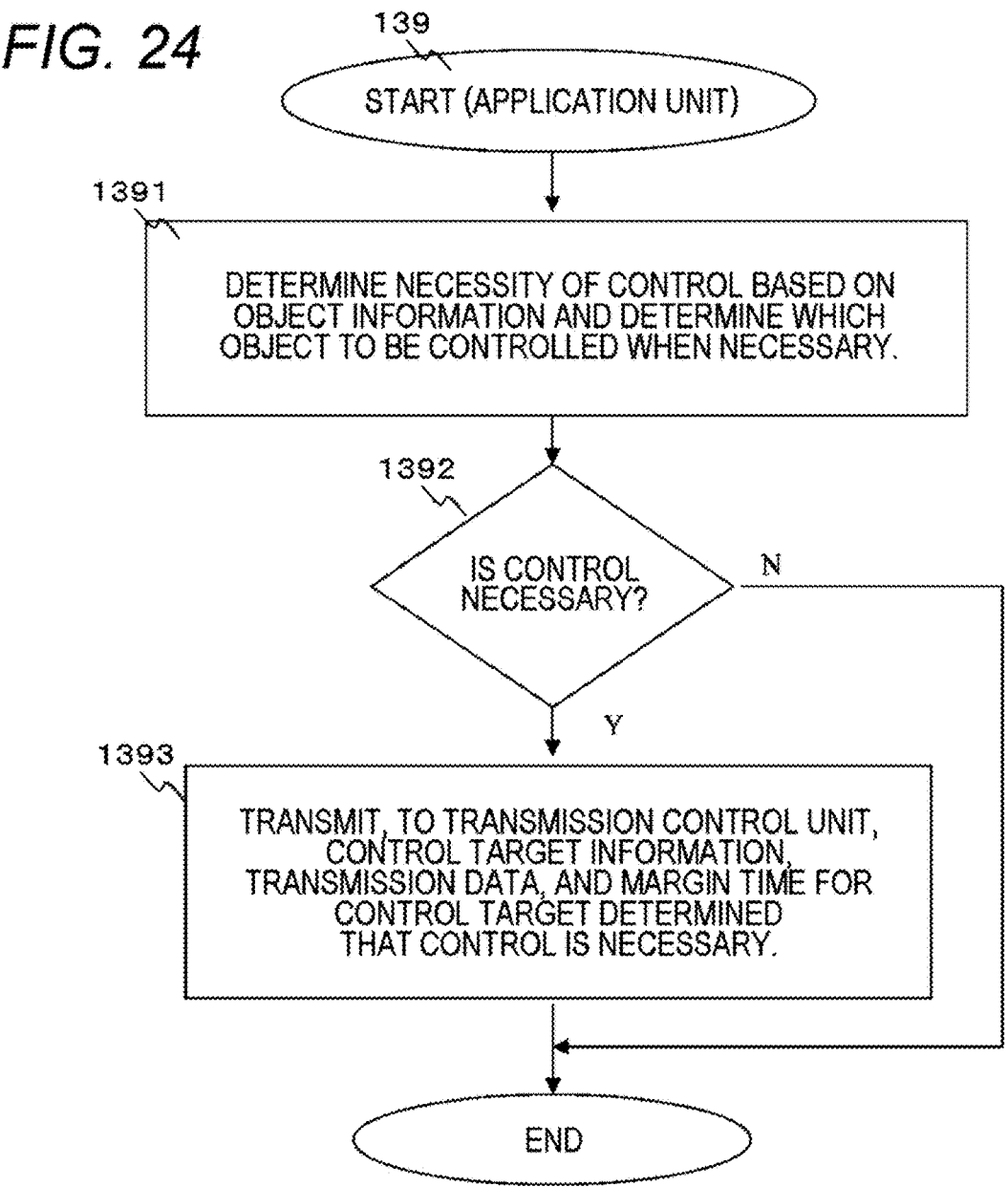

| ITEM | SENSING INFORMATION |
|---|---|
| OBJECT TYPE | PEDESTRIAN A |
| OBJECT ID | 1 |
| STATE | NOT VIEWING ON INFORMATION TERMINAL ⇒ VIEWING |
| TIME STAMP | 12:34:0000 |

| OBJECT ID | ITEM | REACTION TIME | ESTIMATED ACTION END TIME | IP ADDRESS | ESTIMATED COMMUNICATION TIME |
|---|---|---|---|---|---|
| 1 | VEHICLE A | 100ms | FFF | AAA | 1000ms |
| 2 | VEHICLE B | 200ms | GGG | BBB | 20ms |
| 3 | PEDESTRIAN A | 1000ms | HHH | CCC | 30ms |
| 4 | PEDESTRIAN B | 1000ms | III | DDD | 25ms |
| 5 | SIGNAL | 500ms | JJJ | EEE | 20ms |

GENERAL CONTROL SYSTEM

TECHNICAL FIELD

The present invention relates to a real-time performance improvement technology of a general control system including radio communication.

BACKGROUND ART

A general control system is becoming autonomous in order to provide a movement service and a transport work service for a limited area. Examples thereof include a transport system using a vehicle in a factory site, a warehouse management system using an automated forklift, an automated guided vehicle (AGV), or an AGV with a robot arm, a robot taxi and a self-driving bus for a specific district, and a self-driving truck in a mine.

In a field where these services are provided, a mobile body (autonomous mobile body) that autonomously performs cognition, determination, and control, a mobile body (manned mobile body) operated by a person, and a person such as a pedestrian or a worker coexist to perform each work.

Since a sensing range of a mobile body is limited, a technique is needed to monitor a blind spot of the mobile body using a sensor (infrastructure sensor) installed on a road or in a facility, notify (a device of) the mobile body and a person connected by radio communication about recognition information, or instruct the mobile body or the person to take an action.

PTL 1 discloses a technique with which an infrastructure sensor recognizes another mobile body or a person hidden at a blind spot of a mobile body, and shares information with a corresponding mobile body or notifies the corresponding mobile body about the information.

CITATION LIST

Patent Literature

PTL 1: JP 2019-215785 A

SUMMARY OF INVENTION

Technical Problem

According to the technique disclosed in PTL 1, an improvement in safety for a mobile body and a person can be expected.

However, since a radio wave condition of radio communication varies depending on a place because of a shadow of a building or a vehicle, a communication time varies depending on a place of a mobile body or a person. Therefore, when recognition information is shared with or an action instruction is given to a plurality of mobile bodies or persons, it takes time for communication with the mobile bodies or the persons having poor radio wave conditions, and thus sharing of recognition information with or giving of an action instruction to other mobile bodies or persons are likely to be delayed.

Furthermore, the technique disclosed in PTL 1 does not consider a situation where different types mobile bodies coexist or mobile bodies and persons coexist in a field. The time (control reaction time) between reaction after sharing of the recognition information and reception of the control instruction and the end of the action depends on a mobile body and a person.

For example, the control reaction time required for a braking distance after transmission of a stop instruction to a person and a mobile body different from the person is described. In a case where the mobile body requires a longer control reaction time than the person, a collision warning recognition time is longer for the person than for the mobile body if the warning is issued to both of them at the same time. However, a final control reaction time is shortened for the person because an action end time until completion of stop is short.

That is, in a case where there is a collision risk between a person in a poor communication state and a mobile body in a good communication state in a place with a blind spot, a problem arises that the collision risk becomes higher when information is shared in the order of the mobile body and the person than in the opposite case.

As described above, in a case where the operating environment of the general control system is complicated, it is difficult to set the priority in advance in the execution order of processing and communication.

The present invention has been made to solve the above problems, and an object of the present invention is to provide a general control system capable of calculating a margin time based on a sensing time of an infrastructure sensor, a radio communication time, and a reaction time of a control target, controlling an execution order of an application and communication based on the margin time, and improving real-time performance.

Solution to Problem

A general control system of the present invention for solving the above problems is configured as follows.

A general control system includes a mobile body detection unit that detects a mobile body and transmits information about the mobile body, and a control system that receives the information about the mobile body transmitted by the mobile body detection unit and transmits control information to a control processing unit of the mobile body based on the received information about the mobile body. The control system includes a margin time calculation unit that calculates a first margin time based on a reaction time of the mobile body and a communication control estimation required time, a processing management unit that determines an execution order of the control information based on the first margin time, an application unit that calculates the control information based on the information about the mobile body and the execution order determined by the processing management unit, and a transmission control unit that calculates a second margin time based on the reaction time of the mobile body and communication control actual required time, and transmits the control information to the control processing unit in accordance with the second margin time.

Advantageous Effects of Invention

According to the present invention, a general control system can be provided that is capable of calculating a margin time based on a sensing time of an infrastructure sensor, a radio communication time, and a reaction time of a control target, controlling an execution order of an appli-

BRIEF DESCRIPTION OF DRAWINGS

FIG. 7 is a processing flowchart of a control time estimation unit according to the first embodiment.

FIG. 8 is a processing flowchart of a margin time calculation unit according to the first embodiment.

FIG. 24 is a processing flowchart of the application unit according to the second embodiment.

FIG. 25 is a diagram illustrating an example of object information according to the second embodiment.

FIG. 26 is a diagram illustrating another example of object information according to the second embodiment.

FIG. 27 is a diagram illustrating an example of a control target information table according to the second embodiment.

DESCRIPTION OF EMBODIMENTS

A general control system according to the present invention calculates a margin time based on a sensing time of a mobile body detection unit, a radio communication time, and a reaction time of a control target, and controls an execution order of an application and communication based on the margin time, thereby providing recognition information to the control target or notifying the control target about an action instruction in real time.

Hereinafter, the embodiments of the present invention will be described with reference to the drawings.

In the embodiments, an infrastructure sensor is described as an example of a mobile body detection unit, but the mobile body detection unit is not limited to the infrastructure sensor, and any detection device that detects a mobile body is applicable thereto.

EMBODIMENTS

First Embodiment

Figure 1:
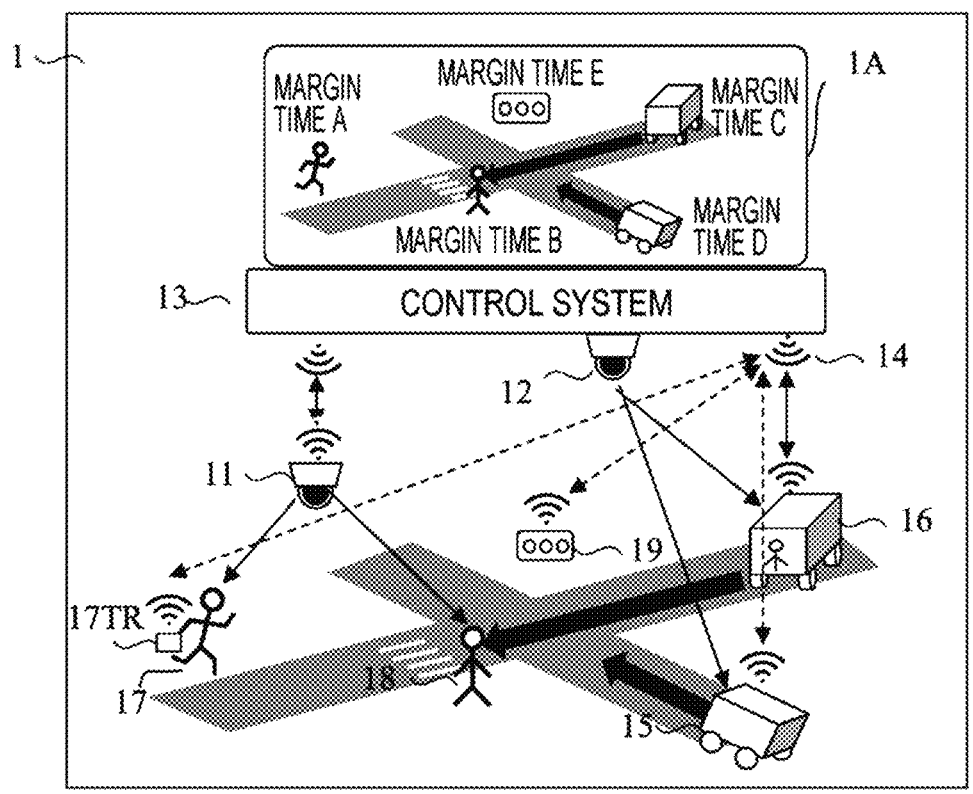
FIG. 1 is an overall schematic configuration diagram of a general control system according to a first embodiment.

FIG. 1 is an overall schematic configuration diagram of a general control system according to a first embodiment of the present invention.

In FIG. 1, a general control system 1 is a system that controls an infrastructure sensor 11, an infrastructure sensor 12, a control system 13, a radio device 14, an automobile 15, a bus 16, a pedestrian 17 carrying a radio communication device 17TR, a pedestrian 18, and a traffic light 19. As shown in FIG. 1, the infrastructure sensors 11 and 12 may be, for example, a camera capable of receiving and transmitting information.

Note that FIG. 1 illustrates an explanatory portion 1A indicating that the pedestrian 17, the pedestrian 18, the traffic light 19, the automobile 15, and the bus 16 have different margin times.

The infrastructure sensor 11 and the infrastructure sensor 12 communicate with each other by wired communication or radio communication. The radio device 14 wirelessly communicates with the automobile 15, the bus 16, the pedestrian 17, and the traffic light 19. In a case where the pedestrian 18 possesses a communication device, the radio device 14 wirelessly communicates with the radio communication device of the pedestrian 18.

Figure 2:
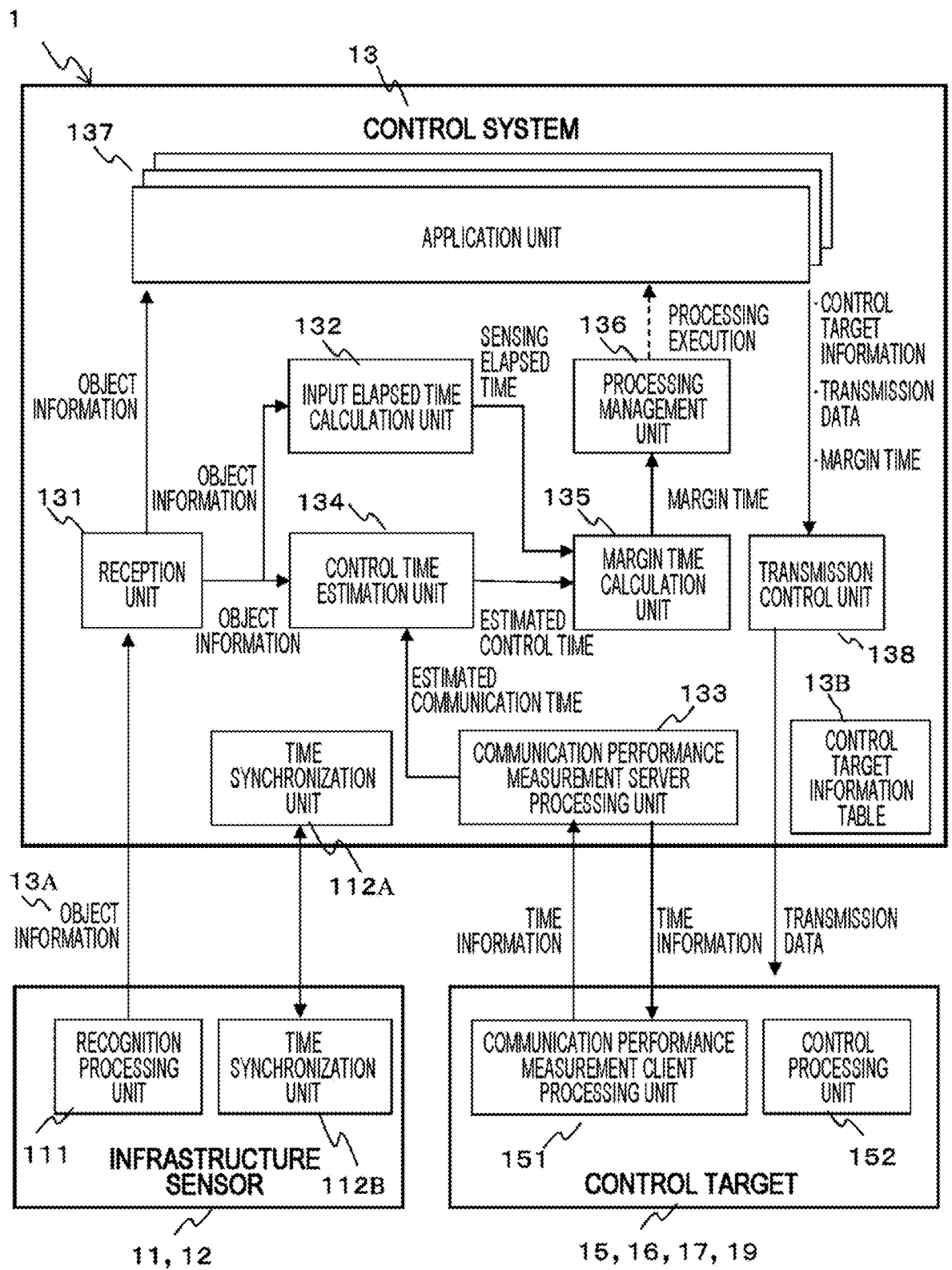
FIG. 2 is an internal configuration diagram of the control system according to the first embodiment.

FIG. 2 is an internal configuration diagram of the control system 13 according to the first embodiment, and is a diagram illustrating a processing flow of each unit.

In FIG. 2, recognition processing units 111 of the infrastructure sensors 11 and 12 analyze sensing contents and transmit detected object information 13A to a reception unit 131 of the control system 13. The times of the control system 13 and the infrastructure sensors 11 and 12 can be synchronized with each other by a time synchronization unit 112A of the control system 13 and time synchronization units 112B of the infrastructure sensors 11 and 12.

The reception unit 131 transmits the object information 13A to an input elapsed time calculation unit 132, a control time estimation unit 134, and application units 137. A communication performance measurement server processing unit 133 transmits time information to a communication performance measurement client processing unit 151, and when receiving the time information, the communication performance measurement client processing unit 151 returns the time information to the communication performance measurement server processing unit 133. The communication performance measurement server processing unit 133 calculates an estimated communication time based on the received time information, and transmits the estimated communication time to the control time estimation unit 134.

The input elapsed time calculation unit 132 calculates a sensing elapsed time based on the time information included in the object information 13A, and transmits the sensing elapsed time to a margin time calculation unit 135. The control time estimation unit 134 calculates an estimated control time based on the object information 13A and the estimated communication time, and transmits the estimated control time to the margin time calculation unit 135.

The margin time calculation unit 135 calculates a margin time based on the sensing elapsed time and the estimated control time, and transmits the margin time to a processing management unit 136.

The processing management unit 136 activates the application units 137 based on the margin time. The application units 137 notify a transmission control unit 138 about the control target information, the transmission data, and the margin time. The transmission control unit 138 transmits the transmission data in accordance with the margin time to the control processing units 152 of the control targets 15, 16, 17, and 19 based on the control target information.

Hereinafter, details of operation flows according to the first embodiment will be described.

Figure 3:
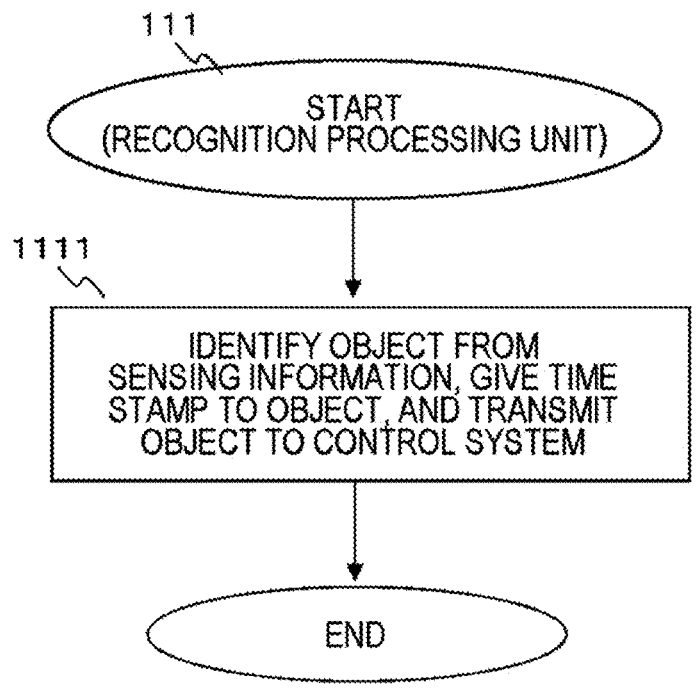
FIG. 3 is a processing flowchart of a recognition processing unit according to the first embodiment.

FIG. 3 is a processing flowchart of the recognition processing unit 111. Each step in FIG. 3 will be described below.

(FIG. 3: Step 1111)

The recognition processing units 111 identify an object from the sensing information about the infrastructure sensors 11 and 12, give a time stamp to an object, and transmits the time stamp to the control system 13.

Figure 4:
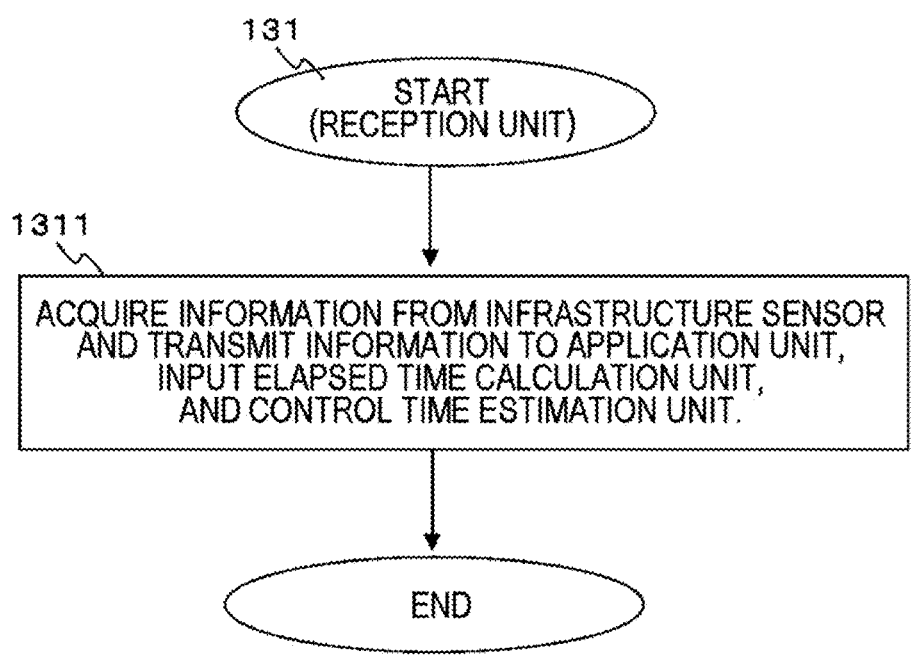
FIG. 4 is a processing flowchart of a reception unit according to the first embodiment.

FIG. 4 is a processing flowchart of the reception unit 131. Each step in FIG. 4 will be described below.

(FIG. 4: Step 1311)

The reception unit 131 acquires information from the infrastructure sensors 11 and 12, and transmits the information to the application units 137, the input elapsed time calculation unit 132, and the control time estimation unit 134.

Figure 5:
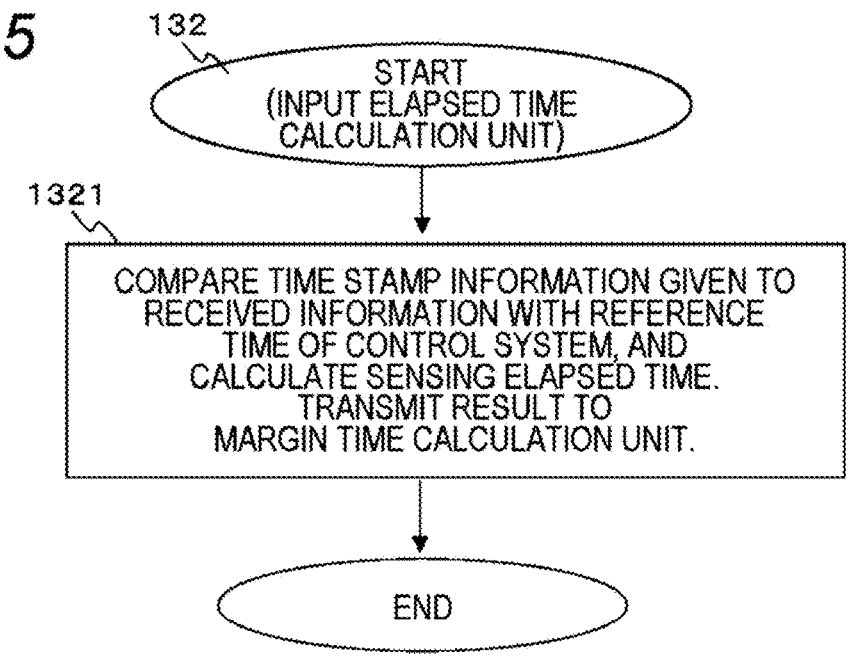
FIG. 5 is a processing flowchart of an input elapsed time calculation unit according to the first embodiment.

FIG. 5 is a processing flowchart of the input elapsed time calculation unit 132. Each step in FIG. 5 will be described below.

(FIG. 5: Step 1321)

The input elapsed time calculation unit 132 compares the time stamp information assigned to the reception information with a reference time of the control system 13, and calculates a sensing elapsed time ($T_{IS}+T_{UL}$). The result is transmitted to the margin time calculation unit 135.

Figure 6:
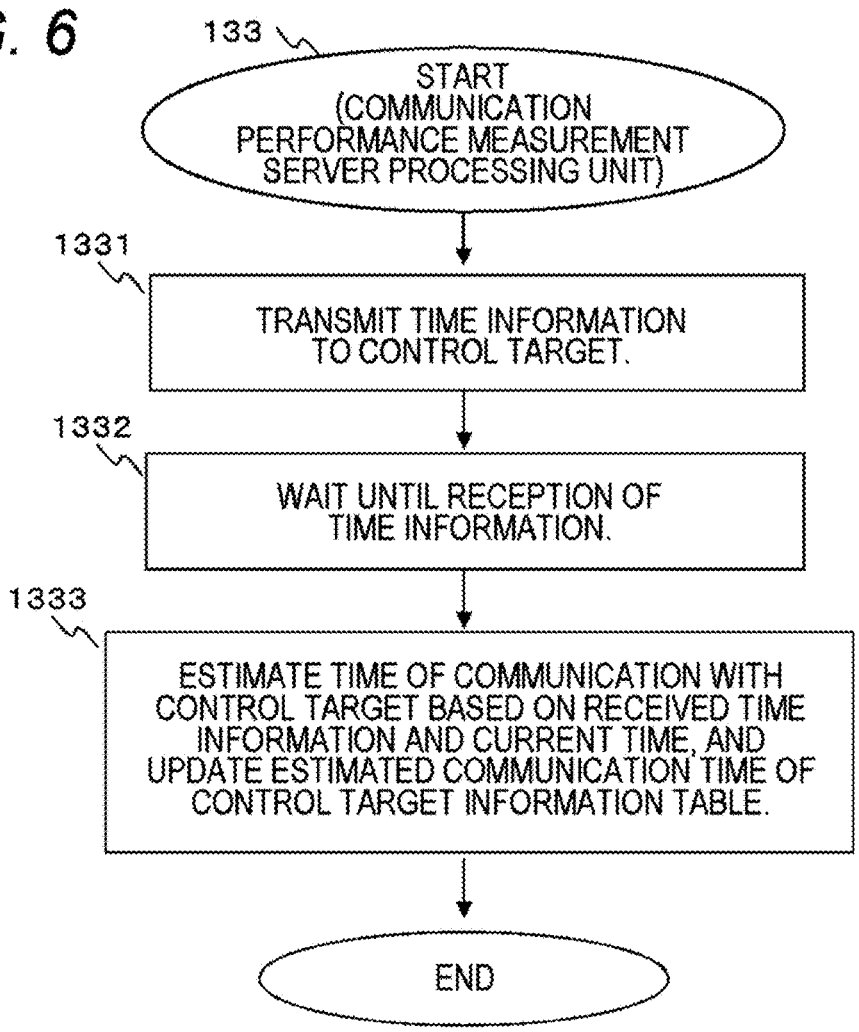
FIG. 6 is a processing flowchart of a communication performance measurement server processing unit according to the first embodiment.

FIG. 6 is a processing flowchart of the communication performance measurement server processing unit 133. Each step in FIG. 6 will be described below.

(FIG. 6: Step 1331)

The communication performance measurement server processing unit 133 transmits the time information to each of the control targets 15, 16, 17, and 19.

(FIG. 6: Step 1332)

The communication performance measurement server processing unit 133 waits until the time information transmitted from the control targets 15, 16, 17, and 19 is received.

(FIG. 6: Step 1333)

The communication performance measurement server processing unit 133 estimates a time of communication with the control targets based on the time information received from the control targets 15, 16, 17, and 19 and a current time, and updates the estimated communication time in the control target information table 13B.

FIG. 7 is a processing flow of the control time estimation unit 134. Each step in FIG. 7 will be described below.

(FIG. 7: Step 1341)

The control time estimation unit 134 refers to the control target information table 13B based on the object ID of the object information, acquires the reaction time and the estimated communication time of the control target, and calculates the estimated control time. The calculated result is transmitted to the margin time calculation unit 135.

The control target information table 13B may not be referred to for the reaction time of the control target. For example, an estimation may be made using the object information based on information about whether each control target looks at a device, whether each control target faces a mobile body, or an age of a person.

That is, the mobile body includes a pedestrian, the control processing unit 152 is the radio communication device 17TR possessed by the pedestrian 17, and the control time estimation unit 134 can also estimate the reaction time of the pedestrian 17 based on information about whether the pedestrian looks at the radio communication device 17TR, whether the pedestrian faces the automobile 15 or the bus 16 which is the mobile body, or the age of the pedestrian 17.

FIG. 8 is a processing flowchart of the margin time calculation unit 135. Each step in FIG. 8 will be described below.

(FIG. 8: Step 1351)

The margin time calculation unit 135 calculates a margin time $T1_{Laxity}$ based on the sensing elapsed time and the estimated control time, and transmits the margin time to the processing management unit 136. In the first embodiment, the entire latency ($T_{E2EL}$) and $E_{SA}$ are treated as a fixed time.

The following equation (1) is a calculation formula of the margin time $T1_{Laxity}$, and the following equation (2) is a calculation equation of the margin time $T2_{Laxity}$.

$$T1_{Laxity}=T_{E2EL}-(T_{IS}+T_{UL}+E_{SA}+E_{DL}+E_{VA}) \quad (1)$$

$$T2_{Laxity}=T_{E2EL}-(T_{IS}+T_{UL}+T_{SA}+E_{DL}+E_{VA}) \quad (2)$$

In the above equation (1), a margin time ($T1_{Laxity}$) can be calculated by subtracting the sensing elapsed time ($T_{IS}+T_{UL}$) of the infrastructure sensors 11 and 12, an estimated application execution time ($E_{SA}$), an estimated communication time ($E_{DL}$), and a control target reaction time ($E_{VA}$) from the entire latency ($T_{E2EL}$).

In the above equation (2), a margin time ($T2_{Laxity}$) can be calculated by subtracting each sensing elapsed time ($T_{IS}+T_{UL}$) of the infrastructure sensors 11 and 12, an actual application execution time ($T_{SA}$), the estimated communication time ($E_{DL}$), and the control target reaction time ($E_{VA}$) from the entire latency ($T_{E2EL}$).

The entire latency ($T_{E2EL}$) is a time from sensing until completion of a control instruction for a mobile body or a person to the end of an action (a time from a point in time when the mobile body detection unit receives information about the mobile body to the end of the action of the mobile body). Furthermore, the overall latency is a time until the mobile bodies 15, 16, 17, and 19 stop, or a time in consideration of a reaction time until the person 18 is notified about an instruction or a warning using an image, a sound, or a vibration, and an action is taken and completed.

For example, the overall latency is information on the overall time until the mobile body stops by remote operation (steering control), or the overall time until the person is stopped by display on a device carried by a person, generation of a sound, and a vibration.

That is, the control information to be transmitted to the control processing unit 152 of the mobile body is information relating to stop or steering control of a vehicle, or an image, a sound, or a vibration for giving an instruction or warning to a person.

Figure 9:
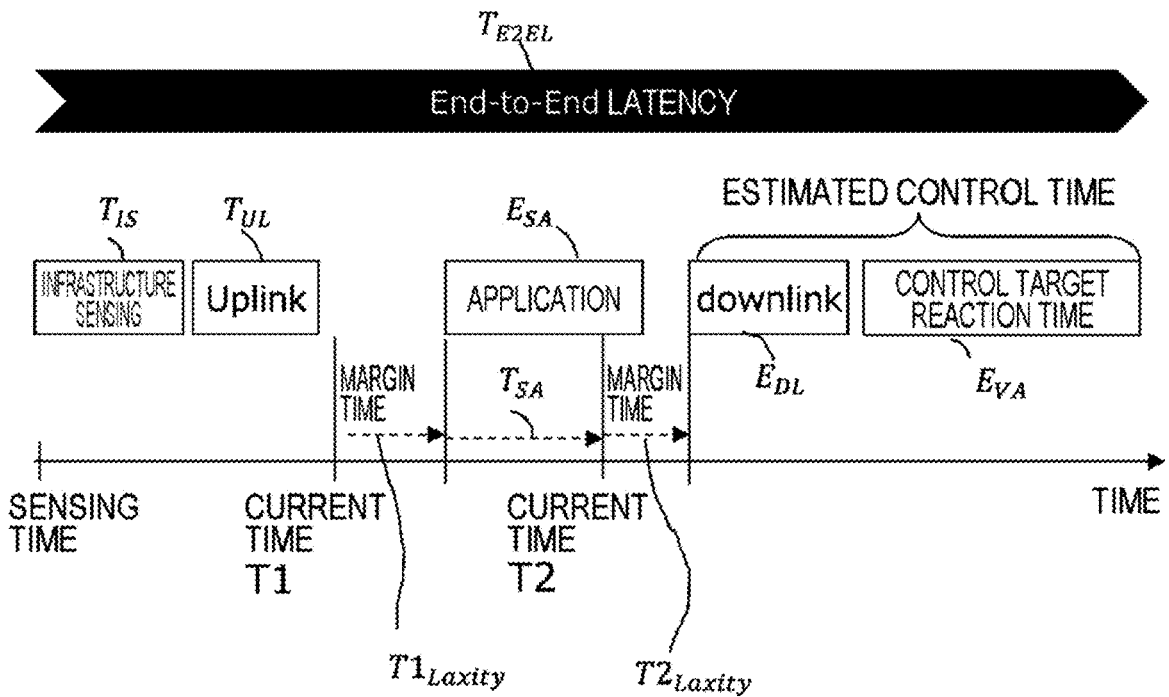
FIG. 9 is a calculation explanatory diagram of the margin time according to the first embodiment.

FIG. 9 is an explanatory diagram of the above equations (1) and (2).

In FIG. 9, a sensing time (detection time) during which the control targets 15, 16, 17, and 19 of the infrastructure sensors 11 and 12 are detected is denoted by $T_{IS}$, and an uplink time of sensor signals (detection signals) from the infrastructure sensors 11 and 12 is denoted by $T_{UL}$. An estimated application execution time of the application unit 137 is denoted by $E_{SA}$, an estimated communication time between the control system 13 and the control processing unit 152 of each control target is denoted by $E_{DL}$, and a control target reaction time is denoted by $E_{VA}$. A value obtained by adding the estimated communication time $E_{DL}$ and the control target reaction time $E_{VA}$ is the estimated control time.

In addition, a value obtained by adding the estimated control time (the estimated communication time $E_{DL}$+the control target reaction time $E_{VA}$), the estimated application execution time $E_{SA}$, the sensing time $T_{IS}$, and the uplink time $T_{UL}$ is a communication control estimation required time.

Further, a value obtained by adding the estimated control time (the estimated communication time $E_{DL}$+the control target reaction time $E_{VA}$), the actual application execution time $T_{SA}$, which is an actual execution time of each application unit 137, the sensing time $T_{IS}$, and the uplink time $T_{UL}$ is a communication control actual required time.

The actual application execution time $T_{SA}$ is a time from the start to the end of execution of the application. The estimated application execution time $E_{SA}$ is set to be longer than the actual application execution time $T_{SA}$. A first margin time $T1_{Laxity}$ is a time from the uplink of the sensor signal to the execution of the application, and a second margin time $T2_{Laxity}$ is a time from the end of the application to the start of communication.

Figure 10:
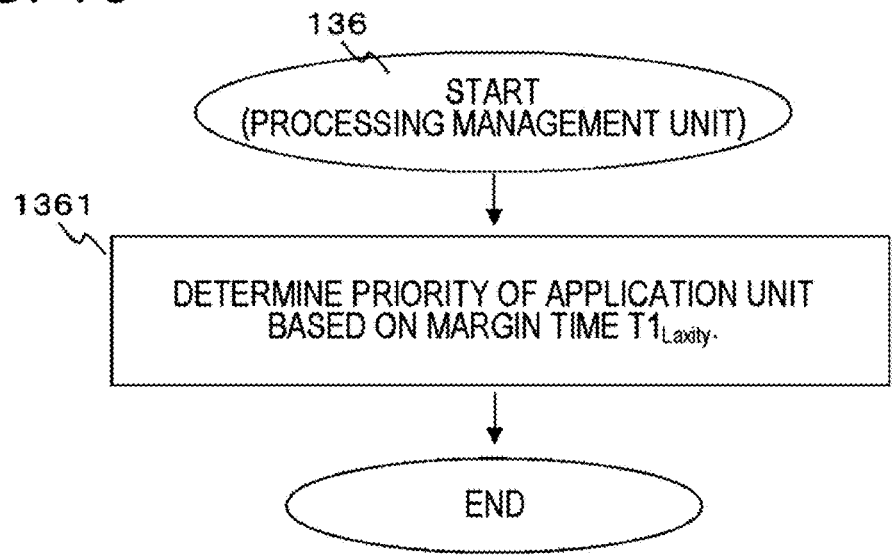
FIG. 10 is a processing flowchart of a processing management unit according to the first embodiment.

FIG. 10 is a processing flowchart of the processing management unit 136. Each step in FIG. 10 will be described below.

(FIG. 10: Step 1361)

The processing management unit 136 determines the execution order of the application units 137 based on the margin time $T1_{Laxity}$ (determines the processing execution order of the control information). For example, the execution order of the application units 137 is determined such that the control information is calculated in ascending order of the margin time $T1_{Laxity}$. In a case where the margin time $T1_{Laxity}$ is a negative value, the processing may not be executed. In the case of a negative value, the processing result is often meaningless, and entire stability of the general control system is improved by stopping the processing and preferentially executing other processing.

Figure 11:
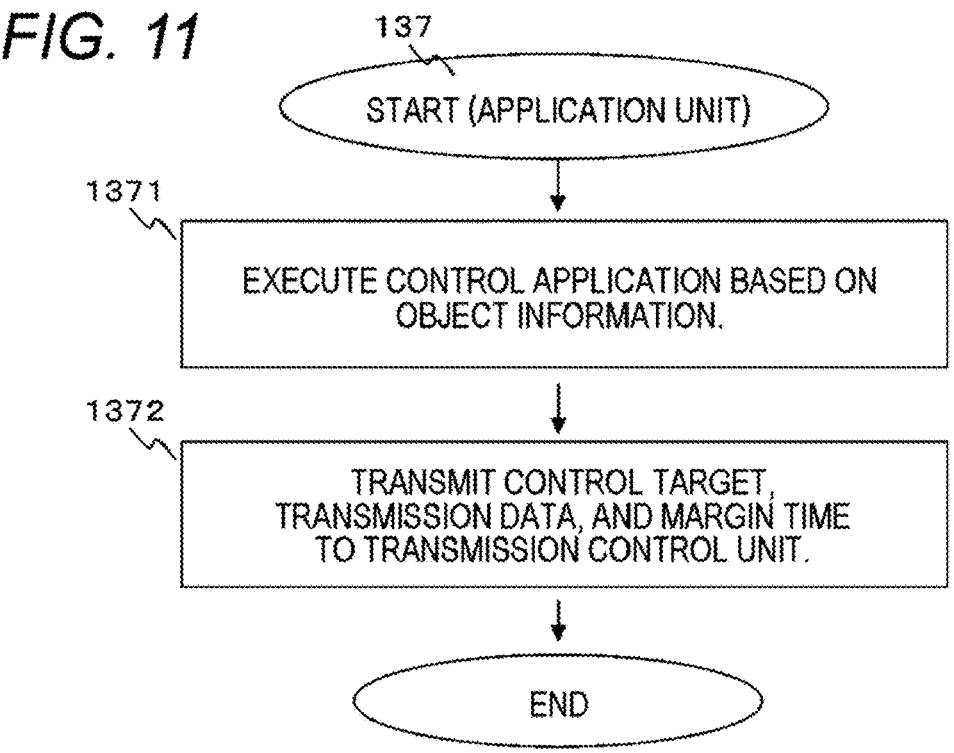
FIG. 11 is a processing flowchart of an application unit according to the first embodiment.

FIG. 11 is a processing flowchart of the application units 137. Each step in FIG. 11 will be described below.

(FIG. 11: Step 1371)

The application unit 137 executes a control application based on the object information.

(FIG. 11: Step 1372)

The application unit 137 transmits the control target, the transmission data, and the margin time $T1_{Laxity}$ to the transmission control unit 138.

Figure 12:
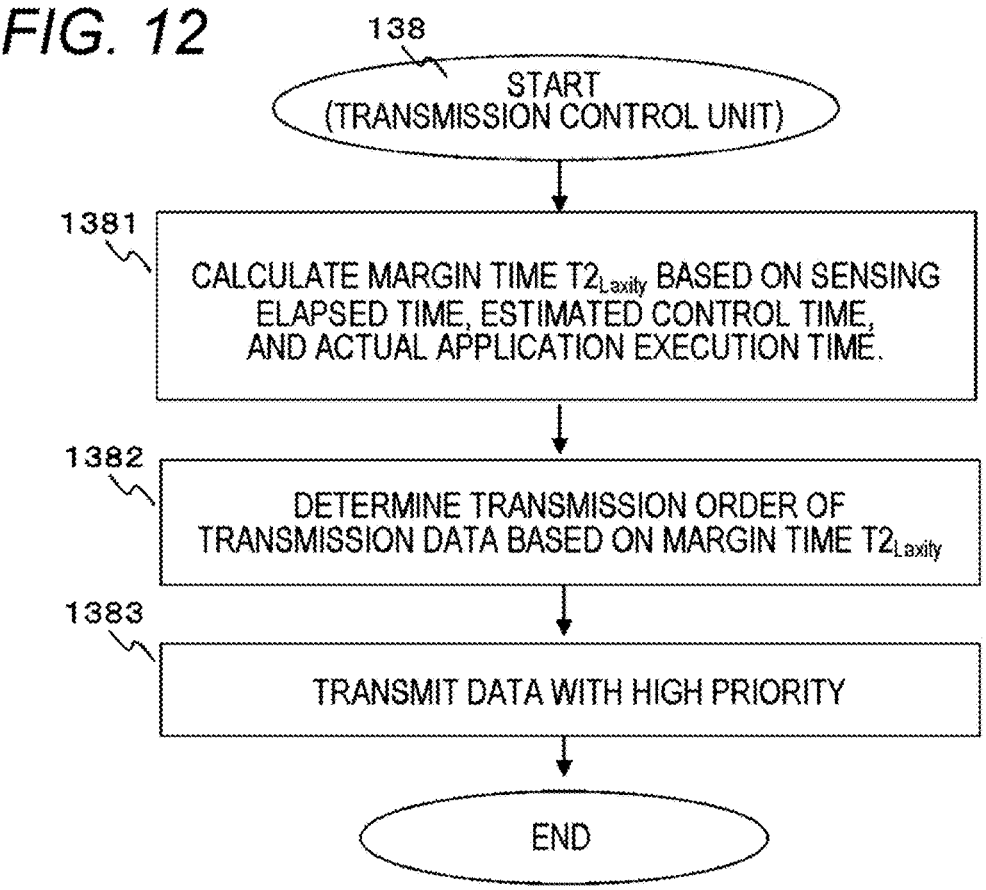
FIG. 12 is a processing flowchart of a transmission control unit according to the first embodiment.

FIG. 12 is a processing flowchart of the transmission control unit 138. Each step in FIG. 12 will be described below.

(FIG. 12: Step 1381)

The transmission control unit 138 calculates the margin time $T2_{Laxity}$ based on the sensing elapsed time, the estimated control time, and the actual application execution time.

(FIG. 12: Step 1382)

The transmission control unit 138 determines the transmission order of the transmission data in accordance with the margin time $T2_{Laxity}$. The transmission control unit 138 transmits the control information to the control processing unit 152 in ascending order of the margin time $T2_{Laxity}$. In a case where the margin time $T2_{Laxity}$ is a negative value, the transmission data may be discarded. In the case of a negative value, the transmission data is often meaningless, and entire stability of the general control system is improved by stopping the data transmission and preferentially transmitting other data.

Alternatively, a countermeasure for shortening the communication time may be taken. For example, instead of retransmission type communication by acknowledgement (ACK), a method of continuously transmitting the same transmission packet in advance or a method using another communication path may be used.

(FIG. 12: Step 1383)

The transmission control unit 138 transmits data with high priority. For example, transmission data having short margin time $T2_{Laxity}$ is transmitted.

Figure 13:
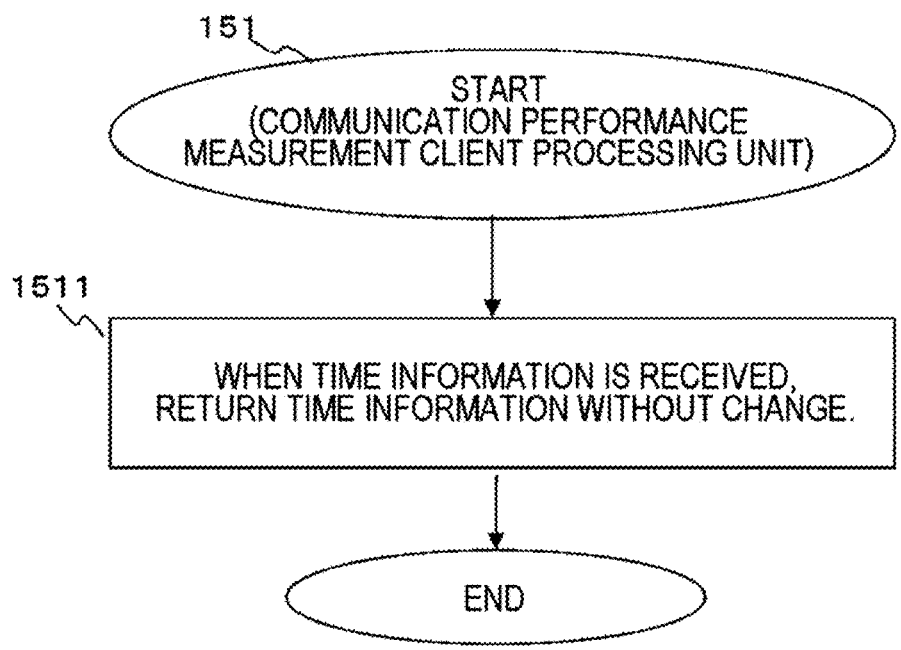
FIG. 13 is a processing flowchart of a communication performance measurement client processing unit according to the first embodiment.

FIG. 13 is a processing flowchart of the communication performance measurement client processing unit 151. Each step in FIG. 13 will be described below.

(FIG. 13: Step 1511)

When receiving the time information from the control system 13, the communication performance measurement client processing unit 151 returns the time information to the communication performance measurement server processing unit 133 of the control system 13 without changing the time information.

Figure 14:
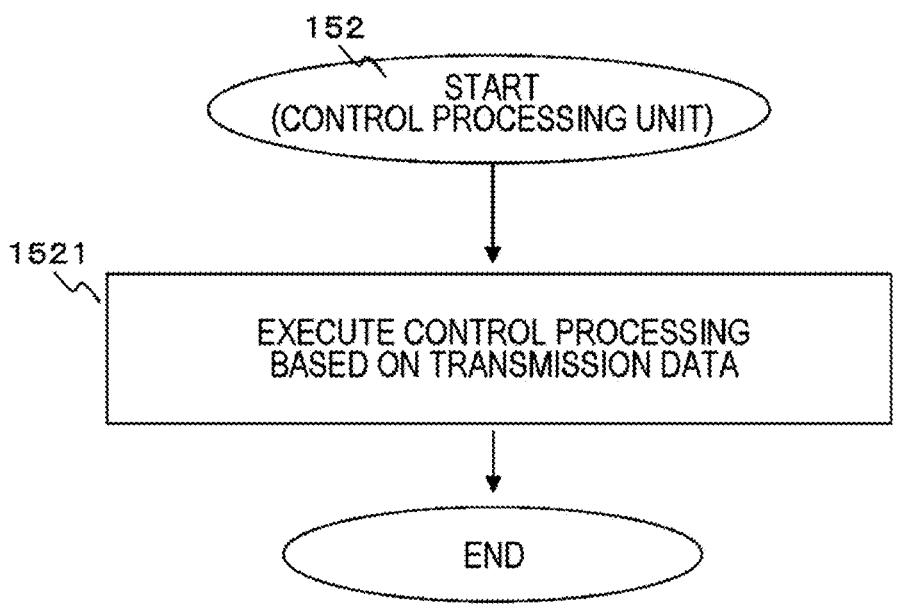
FIG. 14 is a processing flowchart of a control processing unit according to the first embodiment.

FIG. 14 is a processing flowchart of the control processing unit 152. Each step in FIG. 14 will be described below.

(FIG. 14: Step 1521)

The control processing unit 152 executes control processing based on the transmission data from the transmission processing unit 138. For example, in a case where the control target is the automobile 15 or the bus 16, the traveling stop processing is executed. In a case where the control target is the pedestrian 17, an action is indirectly controlled by causing a possessed device to vibrate or give an alarm and give a stop instruction on a screen.

In a case where the control target is the traffic light 19, the color of the signal is changed to an optional color (for example, red).

Figures 15, 16, 17:
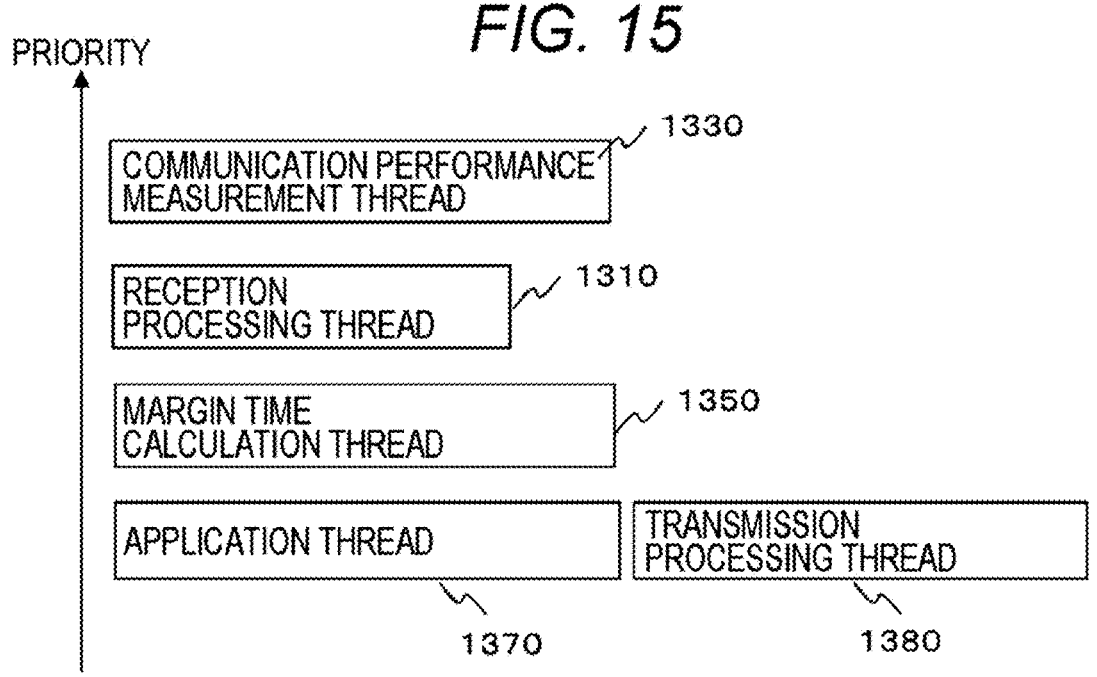
FIG. 15 is a diagram illustrating an example of priority of a thread according to the first embodiment.
FIG. 16 is a diagram illustrating an example of object information according to the first embodiment.
FIG. 17 is a diagram illustrating an example of a control target information table according to the first embodiment.

FIG. 15 is a diagram illustrating an example of thread priority of the control system 13.

In FIG. 15, a communication performance measurement thread 1330 is for operating the communication performance measurement server processing unit 133.

A reception processing thread 1310 is for operating the reception unit 131.

A margin time calculation thread 1350 is for operating the input elapsed time calculation unit 132, the control time estimation unit 134, the margin time calculation unit 135, and the processing management unit 136.

An application thread 1370 is for operating the application unit 137.

A transmission processing thread 1380 is for operating the transmission control unit 138.

FIG. 16 is a diagram illustrating an example of the object information 13A.

In FIG. 16, the object information 13A includes object type, object identification (ID), and time stamps assigned by the infrastructure sensors 11 and 12. In the example of FIG. 16, information sensed as the object type is a vehicle A. In addition, the object ID is 1 and the time stamp is 12:34 and 000 milliseconds.

FIG. 17 is a diagram illustrating an example of a control target information table 13B.

In FIG. 17, the control target information table 13B includes object ID, item, reaction time, IP address, and estimated communication time.

Figure 18:
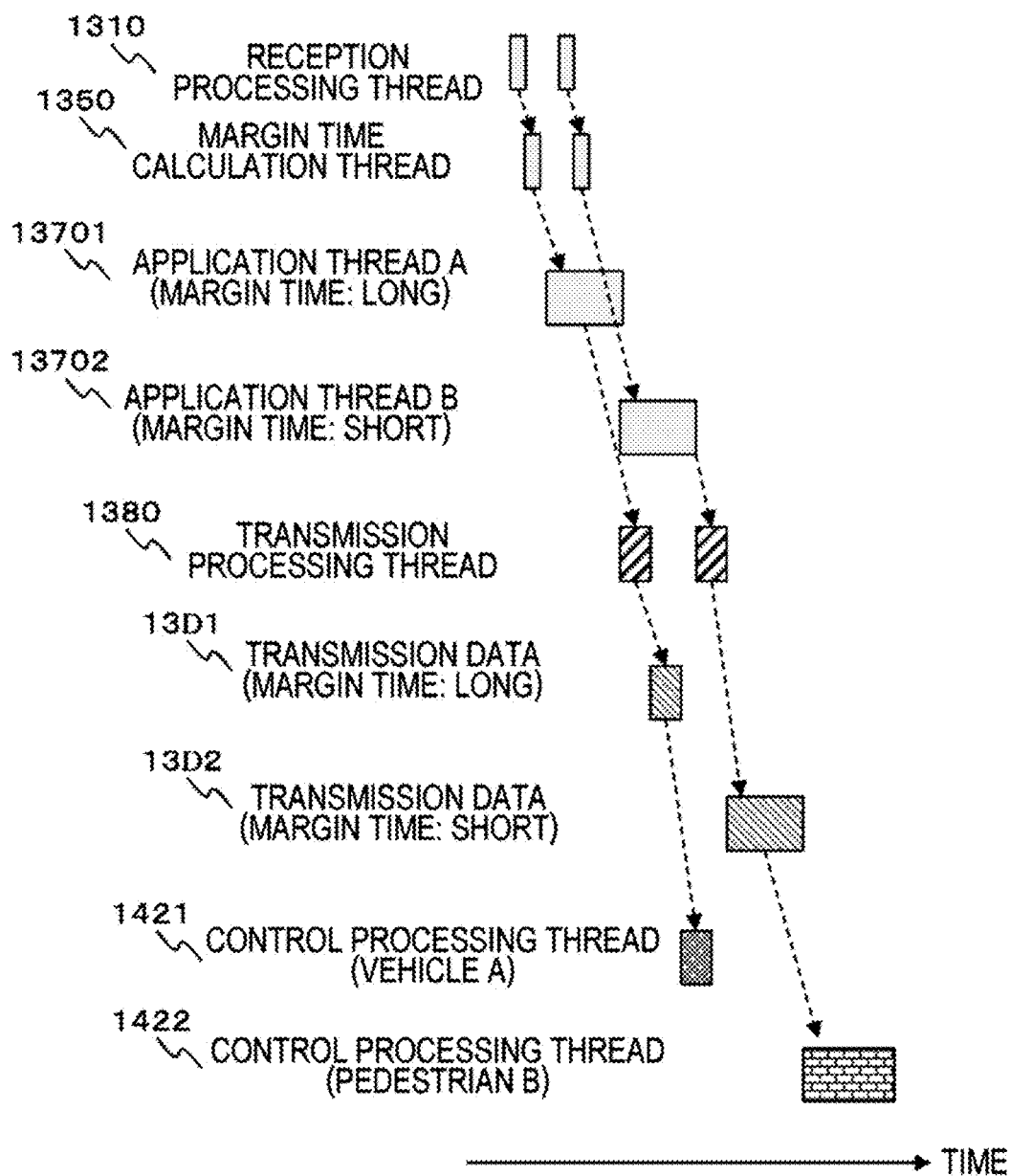
FIG. 18 is an explanatory diagram illustrating an example different from the first embodiment, and an example of an execution timing (FIFO) of the general control system.

Unlike the first embodiment, FIG. 18 is a diagram illustrating an example of the execution timing of the general control system at a time when the execution order of the application units 137 is determined based on a first in first out (FIFO) generally and frequently used without using a margin time, and indicates an elapsed time in a horizontal direction.

The example illustrated in FIG. 18 is an example using two central processing units (CPUs) including a first CPU and a second CPU.

In FIG. 18, the first CPU executes the reception processing thread 1310 and the margin time calculation thread 1350 in the order of reception of the two pieces of object information, and the second CPU executes an application thread A13701 (margin time: long) and an application thread B13702 (margin time: short). The first CPU executes the transmission processing thread 1380 in the order of reception of the two pieces of object information.

Then, a transmission data 13D1 (margin time: long) is transmitted for the object information received earlier, and a control processing thread 1421 (vehicle A) is executed. Further, a transmission data 13D2 (time margin time: short) is transmitted for the object information received later, and a control processing thread 1422 (pedestrian B) is executed.

In the example illustrated in FIG. 18, since the application units 137 are executed in order of reception by the control system 13, the instruction for the vehicle A precedes, and the instruction for the pedestrian B with long communication time and reaction time is delayed.

Figure 19:
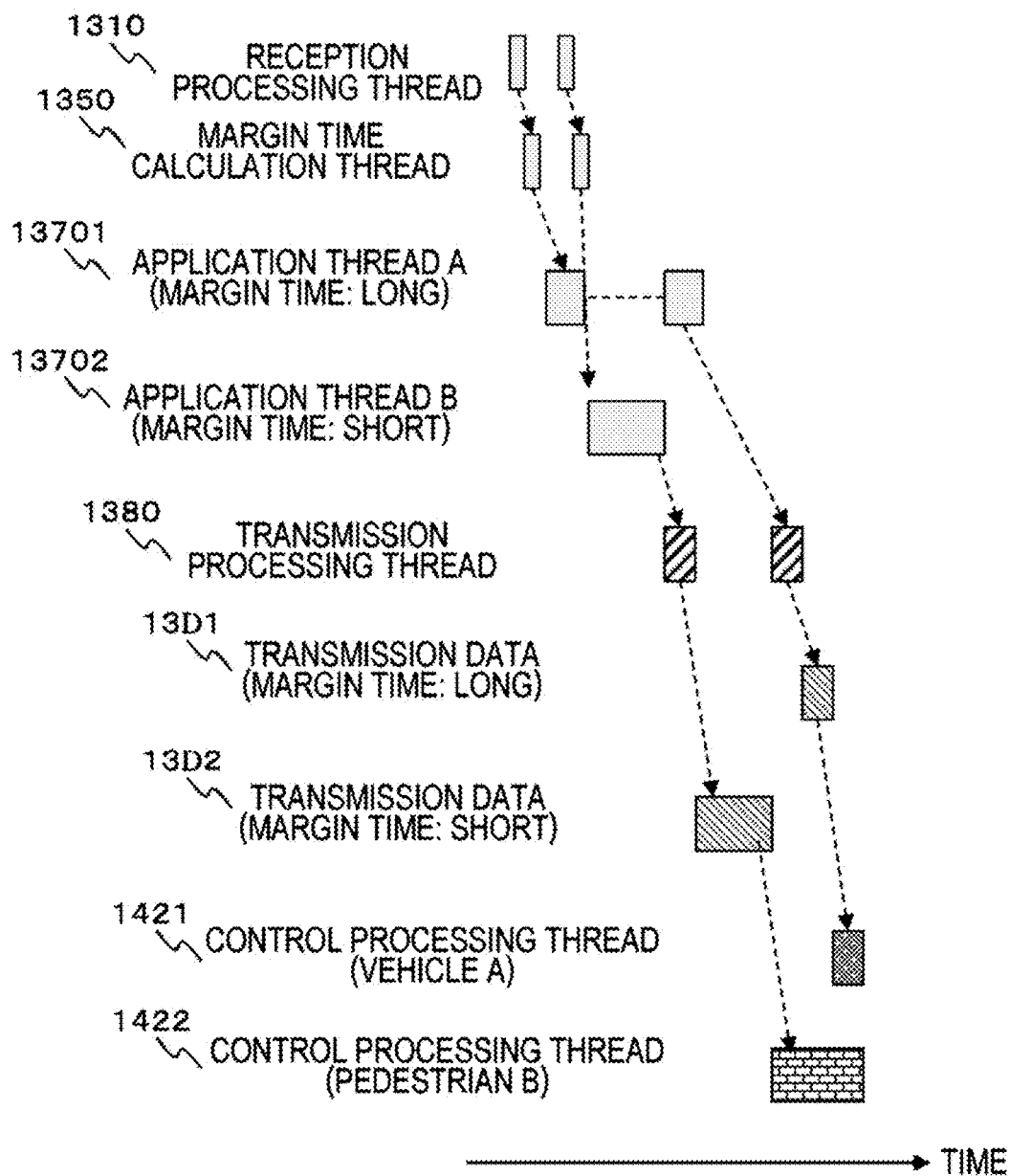
FIG. 19 is an explanatory diagram of an example of an execution timing of the general control system according to the first embodiment.

The example illustrated in FIG. 19 is an example in the case of the first embodiment of the present invention, and is a diagram illustrating an example of the execution timing of the general control system executed based on the margin time.

The example illustrated in FIG. 19 is also the example using the two CPUs including the first CPU and the second CPU like the example illustrated in FIG. 18.

In FIG. 19, the first CPU executes the reception processing thread 1310 and the margin time calculation thread 1350 in the order of reception of the two pieces of object information, and the second CPU executes the application thread A13701 (margin time: long) and the application thread B13702 (margin time: short).

In the execution of the application thread A13701 (margin time: long) and the application thread B13702 (margin time: short), the processing for the object information received later is adjusted to precede the processing for the object information received earlier.

In the transmission processing thread 1380, the first CPU processes, in the two pieces of object information, the object information with short margin time first and processes the object information with long margin time later.

Then, as to the object information with long margin time, the transmission data 13D1 (margin time: long) is transmitted, and the control processing thread 1421 (vehicle A) is executed. Further, as to the object information with short margin time, the transmission data 13D2 (margin time: short) is transmitted, and the control processing thread 1422 (pedestrian B) is executed before the control processing thread 1421 (vehicle A).

In the first embodiment of the present invention illustrated in FIG. 19, the control system 13 preferentially executes the application thread B13702 with short margin time. As a result, the control processing thread 1422 of the pedestrian B can be executed earlier than the control processing thread 1421 (vehicle A) of the vehicle A.

Figure 20:
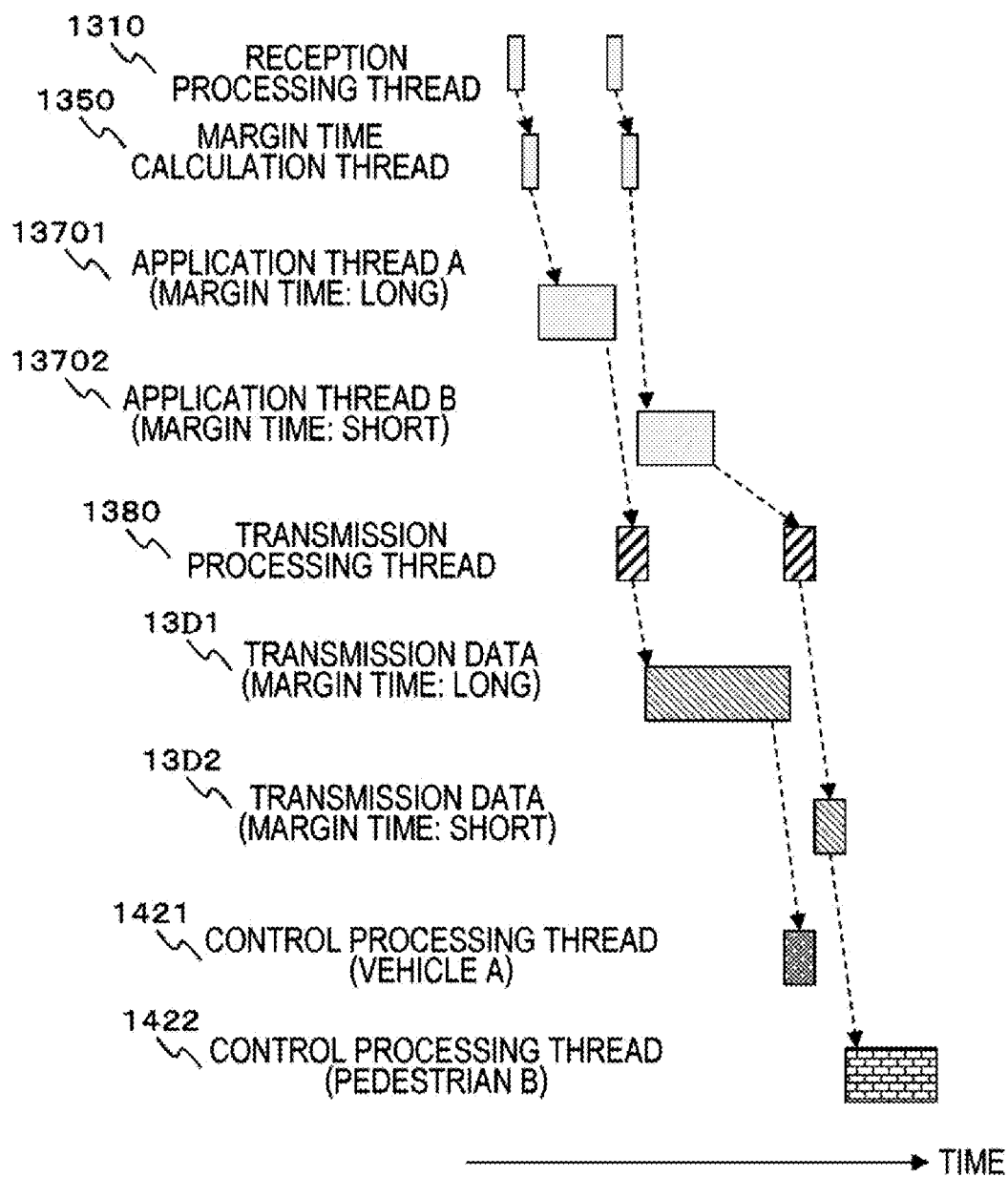
FIG. 20 is an explanatory diagram illustrating an example different from the first embodiment, and another example of the execution timing (FIFO) of the general control system.

Unlike the first embodiment, FIG. 20 is a diagram illustrating an example of the execution timing of the general control system at a time when the execution order of the application units 137 is determined based on the generally frequently used first in first out (FIFO) without using a margin time, and indicates an elapsed time in a horizontal direction.

The example illustrated in FIG. 20 is the example using the two CPUs including the first CPU and the second CPU like the example illustrated in FIG. 18.

In FIG. 20, the first CPU executes the reception processing thread 1310 and the margin time calculation thread 1350 in the order of reception of the two pieces of object information, and the second CPU executes the application thread A13701 (margin time: long) and the application thread B13702 (margin time: short). The first CPU executes the transmission processing thread 1380 in the order of reception of the two pieces of object information.

Then, a transmission data 13D1 (margin time: long) is transmitted for the object information received earlier, and a control processing thread 1421 (vehicle A) is executed. Further, a transmission data 13D2 (time margin time: short) is transmitted for the object information received later, and a control processing thread 1422 (pedestrian B) is executed.

In the example illustrated in FIG. 20, since the application units 137 are operated in order of reception by the control system 13, the instruction for the vehicle A precedes, and the instruction for the pedestrian B with long communication time and reaction time is delayed.

Figure 21:
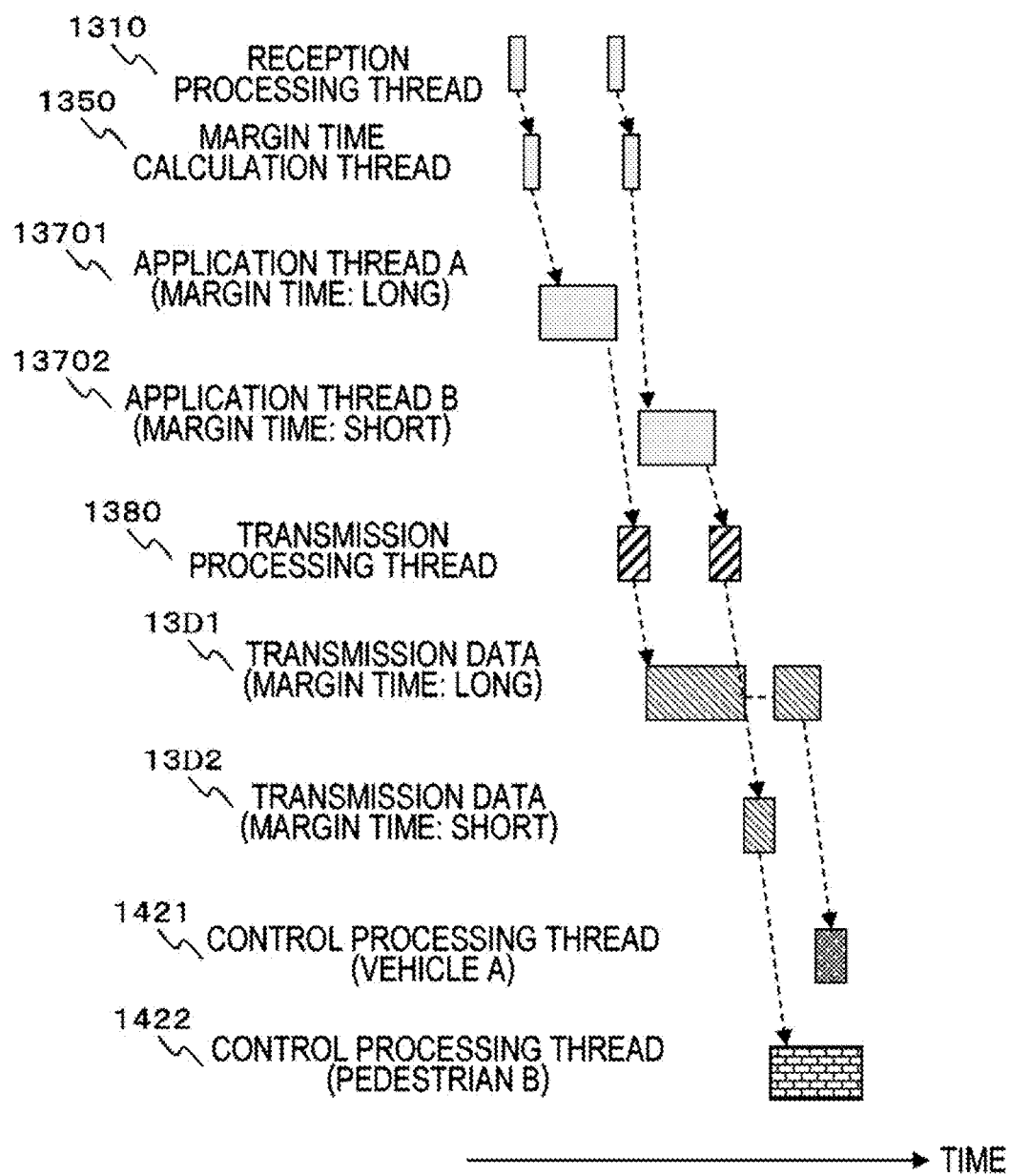
FIG. 21 is an explanatory diagram of another example of the execution timing of the general control system according to the first embodiment.

The example illustrated in FIG. 21 is another example in the case of the first embodiment of the present invention, and is a diagram illustrating an example of the execution timing of the general control system based on the margin time.

The example illustrated in FIG. 21 is also the example using the two CPUs including the first CPU and the second CPU like the example illustrated in FIG. 19.

In FIG. 21, the first CPU executes the reception processing thread 1310 and the margin time calculation thread 1350 in the order of reception of the two pieces of object information, and the second CPU executes the application thread A13701 (margin time: long) and the application thread B13702 (margin time: short).

In the transmission processing thread 1380, the first CPU processes the two pieces of object information in reception order.

As to the object information with long margin time received earlier, the transmission data 13D1 (margin time: long) is delayed, as to the object information with short margin time received later, the transmission data 13D2

(margin time: short) is transmitted earlier than the transmission data 13D1 (margin time: long). As a result, the control processing thread 1422 (pedestrian B) is executed earlier than the control processing thread 1421 (vehicle A).

In the first embodiment of the present invention illustrated in FIG. 21, the control system 13 preferentially executes the application thread B13702 with short margin time. As a result, the control processing thread 1422 of the pedestrian B can be executed earlier than the control processing thread 1421 (vehicle A) of the vehicle A.

As described above, according to the first embodiment of the present invention, the order of the applications and the transmission data is determined based on the margin time in consideration of the time of radio communication with a specific control target and the reaction time of the control target. Therefore, even if the time of the radio communication with a mobile body or a person fluctuates, the order can be dynamically updated, and thus the real-time performance can be improved.

That is, provided is the general control system capable of calculating a margin time based on a sensing time of the infrastructure sensor, a radio communication time, and a reaction time of a control target, controlling the execution order of the applications and communication based on the margin time, and improving real-time performance.

According to the first embodiment of the present invention, it is possible to improve the real-time performance of information sharing with and control instructions for an autonomous mobile body, a manned mobile body, and a person in a field.

In the first embodiment, the reaction time is fixed, but the present invention is not limited thereto. For example, in a case where a pedestrian is viewing a screen of a device, the reaction time may be changed, for example, shortened depending on the situation.

Furthermore, as a situation where the change occurs, it is conceivable that the change occurs depending on the moving speed of the control target and the sensing distance of the infrastructure sensor. For example, in a case where the application is under the remote emergency stop control, the braking distance until stopping becomes longer as the moving speed is higher, and thus the reaction time in anticipation of this situation becomes long.

Further, in the first embodiment, the entire latency is set to a fixed value, but the present invention is not limited thereto. For example, it is conceivable to change the entire latency depending on the moving speed of the control target or the sensing distance. Specifically, the higher the moving speed and the shorter the sensing distance, the shorter the entire latency may be.

According to the first embodiment, since application processing with short margin time is preferentially executed, the present invention is also applicable to different types of applications whose priority changes depending on a situation.

Further, according to the first embodiment, since the transmission processing for the transmission data with short margin time is preferentially executed, the present invention is also applicable to different types of data communication whose priority changes depending on a situation.

In addition, according to the first embodiment, the time of radio communication with a control target is estimated, and thus the present invention can also flexibly cope with a situation in which a specific control target has communication failure.

Further, according to the first embodiment, the processing is executed based on the reaction time of the mobile body and the person, thereby making it possible to flexibly make control even in a situation of varieties of control targets.

In addition, according to the first embodiment, when the margin time is a negative value, the stability of the general control system can be improved by stopping the application processing or rejecting a transmission packet.

In the first embodiment, in a case where the margin time is a negative value, a countermeasure for shortening the communication time may be taken. For example, instead of retransmission type communication by ACK, a method for continuously transmitting the same transmission packet in advance or a method using another communication path may be used to improve the real-time performance.

Second Embodiment

A second embodiment of the present invention will be described below.

A portion of the second embodiment different from the first embodiment will be mainly described with reference to the drawings.

Figure 22:
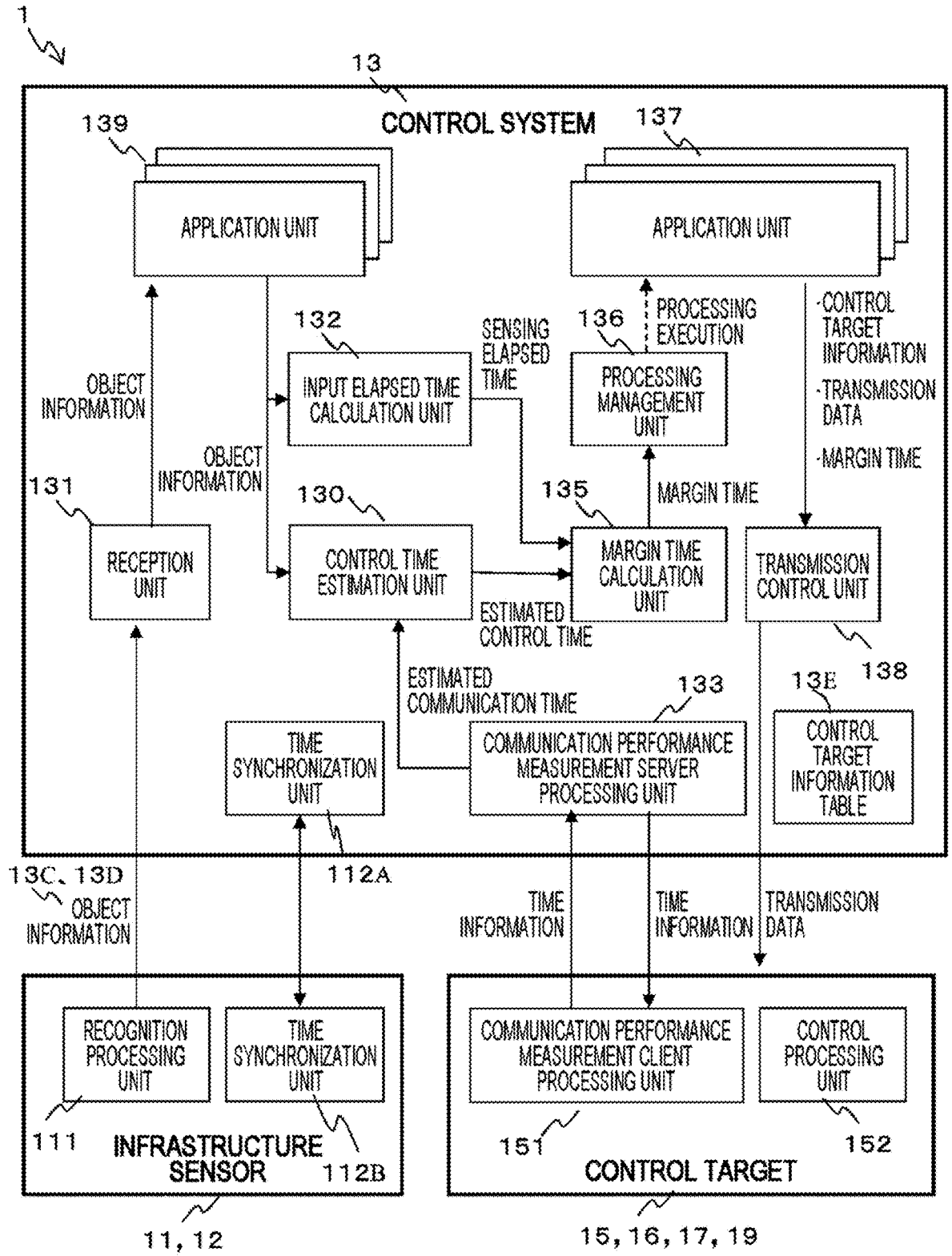
FIG. 22 is an internal configuration diagram of the control system of the general control system according to a second embodiment.

FIG. 22 is a diagram illustrating an internal configuration diagram of the control system 13 according to the second embodiment and a processing flow of each unit.

In the second embodiment, object information 13C and object information 13D are transmitted from the infrastructure sensors 11 and 12 to the reception unit 131. The application unit 139 determines the presence or absence of the control targets 15, 16, 17, and 19 based on the input object information 13C and object information 13D, and transmits determined results to the input elapsed time calculation unit 132 and the control time estimation unit 130. The control time estimation unit 130 updates the reaction time and the estimated action end time stored in a control target information table 13E based on the object information 13C and the object information 13D.

Hereinafter, details of operation flows according to the second embodiment will be described.

Figure 23:
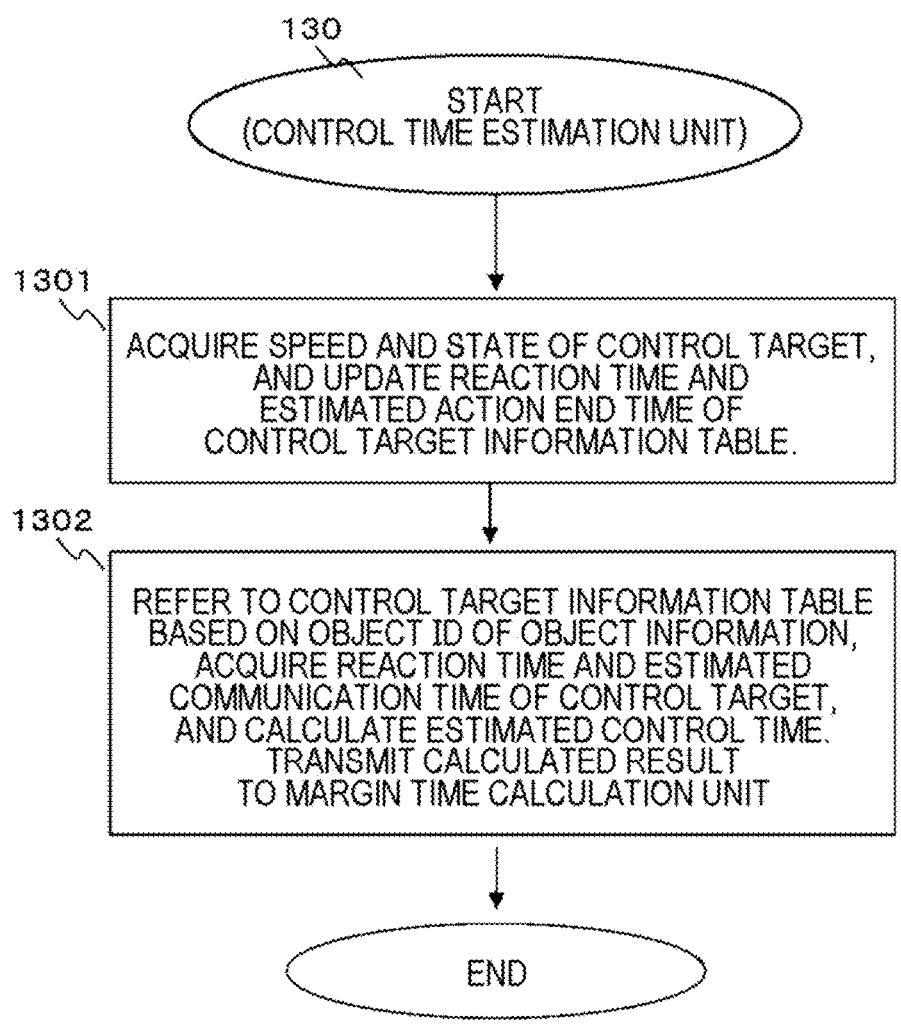
FIG. 23 is a processing flowchart of the control time estimation unit according to the second embodiment.

FIG. 23 is a diagram illustrating a processing flowchart of the control time estimation unit 130. Each step in FIG. 23 will be described below.

(FIG. 23: Step 1301)

The control time estimation unit 130 updates the reaction time and the estimated action end time stored in the control target information table 13E based on information (speed and state) of the control target possessed by the object information 13C and the object information 13D. For example, the estimated action end time becomes longer as the moving speed of the control target becomes faster.

For example, when the state of the control target changes from a state of not viewing the information terminal to a state of viewing the information terminal, the reaction time is shortened. In addition, the present invention is not limited thereto. For example, in a case where a person to be controlled gazes at a mobile body, that is, the body of the person faces the mobile body, the reaction time may be shortened. Further, the reaction time may be changed based on age.

(FIG. 23: Step 1302)

The control time estimation unit 130 refers to the control target information table 13E based on the object ID in the object information 13C or the object information 13D, acquires the reaction time and the estimated communication time of the control target, and calculates the estimated control time. The control time estimation unit 130 transmits the calculation result to the margin time calculation unit 135.

FIG. 24 is a processing flowchart of the application unit 139. Each step in FIG. 24 will be described below.

(FIG. 24: Step 1391)

The application unit 139 determines the necessity of control based on the object information 13C and 13D, and determines which object is to be controlled when necessary.

(FIG. 24: Step 1392)

In step 1392, in a case where control is required, the processing proceeds to step 1393, and in a case where no control is required, the processing ends.

(FIG. 24: Step 1393)

The application unit 139 transmits control target information about a control target determined to need to be controlled, transmission data, and a margin time to the transmission control unit 138.

FIG. 25 is a diagram illustrating an example of the object information 13C.

In FIG. 25, the object information 13C includes object type, object ID, speed, and time stamps assigned by the infrastructure sensors 11 and 12. As compared with the object information 13A (FIG. 16) in the first embodiment, speed information is added to the object information 13C.

FIG. 26 is a diagram illustrating an example of the object information 13D.

In FIG. 26, the object information 13D includes object type, object ID, state, and time stamps assigned by the infrastructure sensors 11 and 12. As compared with the object information 13A (FIG. 16) in the first embodiment, state information is added to the object information 13D.

FIG. 27 is a diagram illustrating an example of the control target information table 13E.

In FIG. 27, the control target information table 13E includes object ID, item, reaction time, estimated action end time, IP address, and estimated communication time. As compared with the control information table 13B (FIG. 17) in the first embodiment, the estimated action end time is added to the control target information table 13E.

The second embodiment can provide the general control system capable of producing the same effects as those of the first embodiment and also coping with various situations by changing the estimated action end time based on the moving speed of the control target.

According to the second embodiment, accurate control can be performed by changing the reaction time of a control target depending on an object state.

REFERENCE SIGNS LIST 1 general control system
11, 12 infrastructure sensor
13 control system
13A, 13C, 13D object information
13B, 13E control target information table
14 radio device
15 automobile
16 bus
17, 18 pedestrian
17TR radio communication device
19 traffic light
111 recognition processing unit
112A, 112B time synchronization unit
130, 134 control time estimation unit
131 reception unit
132 input elapsed time calculation unit
133 communication performance measurement server processing unit
135 margin time calculation unit
136 processing management unit
137, 139 application unit
138 transmission control unit
151 communication performance measurement client processing unit
152 control processing unit

The invention claimed is:

1. A general control system, comprising:
a sensor that detects a mobile body and transmits information about the mobile body; and
a control system, including a receiver, a transmitter, and at least one processor, that receives the information about the mobile body transmitted by the sensor and transmits control information to a control processing unit of the mobile body based on the received information about the mobile body,
wherein the control system is configured to;
calculate a first margin time based on a reaction time of the mobile body and a communication control estimation required time,
determine an execution order of the control information based on the first margin time,
calculate the control information based on the information about the mobile body and the execution order, and
calculate a second margin time based on the reaction time of the mobile body and communication control actual required time, and transmits the control information to the control processing unit based on the second margin time.

2. The general control system according to claim 1, wherein the first margin time is calculated by subtracting the reaction time of the mobile body and the communication control estimation required time from an entire latency that is a time during which the sensor receives the information about the mobile body, the mobile body moves and then stops, and
wherein the second margin time is calculated by subtracting the reaction time of the mobile body and the communication control actual required time from the entire latency.

3. The general control system according to claim 2, wherein the communication control estimated required time is a value obtained by adding an estimated communication time between the control system and the control processing unit, the reaction time of the mobile body, an estimated application execution time of the at least one processor, a time when the sensor detects the mobile body, and an uplink time of a detection signal for detecting the mobile body, and
wherein the communication control estimated actual required time is a value obtained by adding the estimated communication time between the control system and the control processing unit, the reaction time of the mobile body, an actual application execution time of the at least one processor, the time when the sensor detects the mobile body, and the uplink time of the detection signal for detecting the mobile body.

4. The general control system according to claim 3, wherein the at least one processor estimates the estimated communication time and the reaction time of the mobile body.

5. The general control system according to claim 4, wherein the mobile body includes a pedestrian, the control processing unit is a radio communication device possessed by the pedestrian, and the at least one processor estimates a reaction time of the pedestrian based on information about whether the pedestrian looks at the radio communication device, whether the pedestrian faces the mobile body, or an age of the pedestrian.

6. The general control system according to claim 3, wherein the at least one processor includes a first processor and a second processor, and the first processor determines the execution order such that the second processor calculates the control information is calculated in ascending order of the first margin time.

7. The general control system according to claim 3, wherein the at least one processor transmits the control information to the control processing unit in ascending order of the second margin time.

8. The general control system according to claim 3, wherein
in a case where the first margin time or the second margin time is a negative value, calculation of the control information in the at least one processor is discontinued.

9. The general control system according to claim 3, wherein the mobile body includes a pedestrian, and the control processing unit is a radio communication device possessed by the pedestrian.

10. The general control system according to claim 3, wherein
the at least one processor includes a first processor and a second processor, and
the first processor stops calculation of the control information in which the first margin time is long, and causes the second processor to calculate the control information in which the first margin time is short.

11. The general control system according to claim 3, wherein the at least one processor stops transmission of the control information in which second margin time is long and executes the transmission of the control information in which the second margin time is short.

12. The general control system according to claim 1, wherein
the control information to be transmitted to the control processing unit of the mobile body is information related to stop or steering control of a vehicle or an image, a sound, or a vibration for giving an instruction or warning to a person.

* * * * *